(12) United States Patent
Moon et al.

(10) Patent No.: US 10,430,076 B2
(45) Date of Patent: Oct. 1, 2019

(54) DEVICE AND METHOD FOR TEXT ENTRY USING TWO AXES AT A DISPLAY DEVICE

(71) Applicant: MOTOROLA SOLUTIONS, INC., Chicago, IL (US)

(72) Inventors: Jia Min Moon, Ipoh (MY); Hean Kuan Ong, Georgetown (MY); Wei Han Ngan, Teluk Intan (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 93 days.

(21) Appl. No.: 15/844,953

(22) Filed: Dec. 18, 2017

(65) Prior Publication Data

US 2019/0187889 A1    Jun. 20, 2019

(51) Int. Cl.
*G06F 3/0488* (2013.01)
*G06F 3/01* (2006.01)
*G06F 3/041* (2006.01)

(52) U.S. Cl.
CPC .......... *G06F 3/04883* (2013.01); *G06F 3/014* (2013.01); *G06F 3/0416* (2013.01)

(58) Field of Classification Search
CPC ..... G06F 3/014; G06F 3/04883; G06F 3/0416
See application file for complete search history.

(56) References Cited

U.S. PATENT DOCUMENTS

| 8,009,146 B2 | 8/2011 | Pihlaja |
| 9,354,805 B2 | 5/2016 | Thorsander et al. |
| 9,400,567 B2 | 7/2016 | Weir et al. |
| 9,588,620 B2 | 3/2017 | Gao et al. |
| 2008/0118162 A1 | 5/2008 | Siegemund |
| 2009/0228792 A1 | 9/2009 | van Os et al. |
| 2009/0288043 A1 | 11/2009 | Willis |
| 2011/0043455 A1 | 2/2011 | Roth et al. |
| 2011/0239153 A1 | 9/2011 | Carter et al. |
| 2012/0263388 A1 | 10/2012 | Razzaghi |
| 2013/0135288 A1* | 5/2013 | King ................... G06F 3/04812 345/419 |
| 2014/0109016 A1* | 4/2014 | Ouyang ................. G06F 17/24 715/856 |

(Continued)

OTHER PUBLICATIONS

"Autodesk AutoCAD 2015 Tutorial/Drawing Areas—The Crosshairs and Your Mouse"—https://www.youtube.com/watch?v=34uqs5inLX0—date of publication Sep. 19, 2014.

(Continued)

*Primary Examiner* — Muhammad N Edun
(74) *Attorney, Agent, or Firm* — Perry + Currier, Inc.

(57) ABSTRACT

A device and method for text entry using two axes at a display device is provided. One or more lines for text entry are rendered at a display device. A first axis is rendered about parallel to the one or more lines, and a second axis is rendered about perpendicular to the one or more lines. An intersection of the first axis and the second axis define a text entry cursor at the one or more lines, each of the first axis and the second axis being moveable at the display device, to move the intersection, upon receipt of touch input at one or more regions of a touchscreen corresponding to the first axis and the second axis. When input is received at a keyboard, the display device is controlled to render text at the intersection.

20 Claims, 11 Drawing Sheets

(56) References Cited

U.S. PATENT DOCUMENTS

2015/0317004 A1 11/2015 Behzadi et al.
2016/0274686 A1* 9/2016 Alonso Ruiz ....... G06F 3/03547

OTHER PUBLICATIONS

"Silhouette Studio Troubleshooting: How to Turn Off the Crosshairs—Silhouette School"—http://www.silhouetteschoolblog.com/2014/12/silhouette-studio-troubleshooting-how.html—date of publication Dec. 16, 2014.
Vatanator update—Georgi Georief's streamlined iOS drum machine gets new features—Music App Blog—http://musicappblog.com/vatanator-update-4/—date of publication: Mar. 23, 2017.
"Virtual DJ Software—VirtualDJ 8 User Manual—VirtualDJ Remote—Remote on phone"—https://www.virtualdj.com/manuals/virtualdj8/remote/remotephone.html—Uploaded Dec. 18, 2017.
"Line 6 StageScape M20D"—https://www.soundonsound.com/reviews/line-6-stagescape-m20d—published Nov. 2012.

\* cited by examiner

DEVICE AND METHOD FOR TEXT ENTRY USING TWO AXES AT A DISPLAY DEVICE

BACKGROUND OF THE INVENTION

Text input on devices with touch-screen interfaces is commonly used. However, it may be challenging to precisely place a cursor in the exact spot on the touch-screen interface where text editing is to occur. Such a problem may be exacerbated when attempting to place a cursor when the interaction with the touch-screen interface occurs with a glove, as may occur in first responder usage scenarios.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
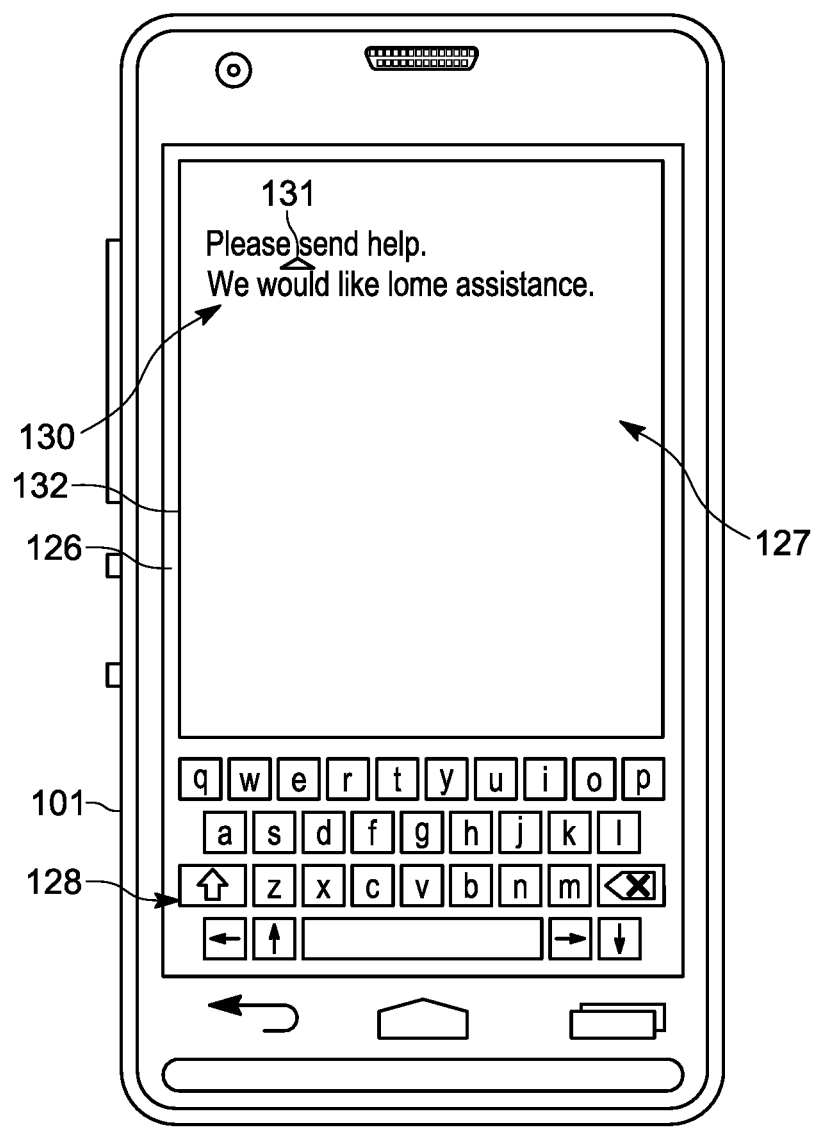
FIG. 1 is a perspective view of a device configured for text entry using two axes at a display device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a device comprising: a controller, a display device, a keyboard and a touchscreen at the display device, the controller configured to: render, at the display device, one or more lines for text entry; render, at the display device, a first axis about parallel to the one or more lines; render, at the display device, a second axis about perpendicular the to one or more lines, an intersection of the first axis and the second axis defining a text entry cursor at the one or more lines, each of the first axis and the second axis being moveable at the display device, to move the intersection, upon receipt of touch input at one or more regions of the touchscreen corresponding to the first axis and the second axis; and when input is received at the keyboard, control the display device to render text at the intersection.

Another aspect of the specification provides a method comprising: rendering at a display device, via a controller, one or more lines for text entry; renderings at the display device, via the controller, a first axis about parallel to the one or more lines; rendering at the display device, via a controller, a second axis about perpendicular the to one or more lines, an intersection of the first axis and the second axis defining a text entry cursor at the one or more lines, each of the first axis and the second axis being moveable at the display device, to move the intersection, upon receipt of touch input at one or more regions of a touchscreen corresponding to the first axis and the second axis; and when input is received at a keyboard, controlling, via the controller, the display device to render text at the intersection.

Figure 2:
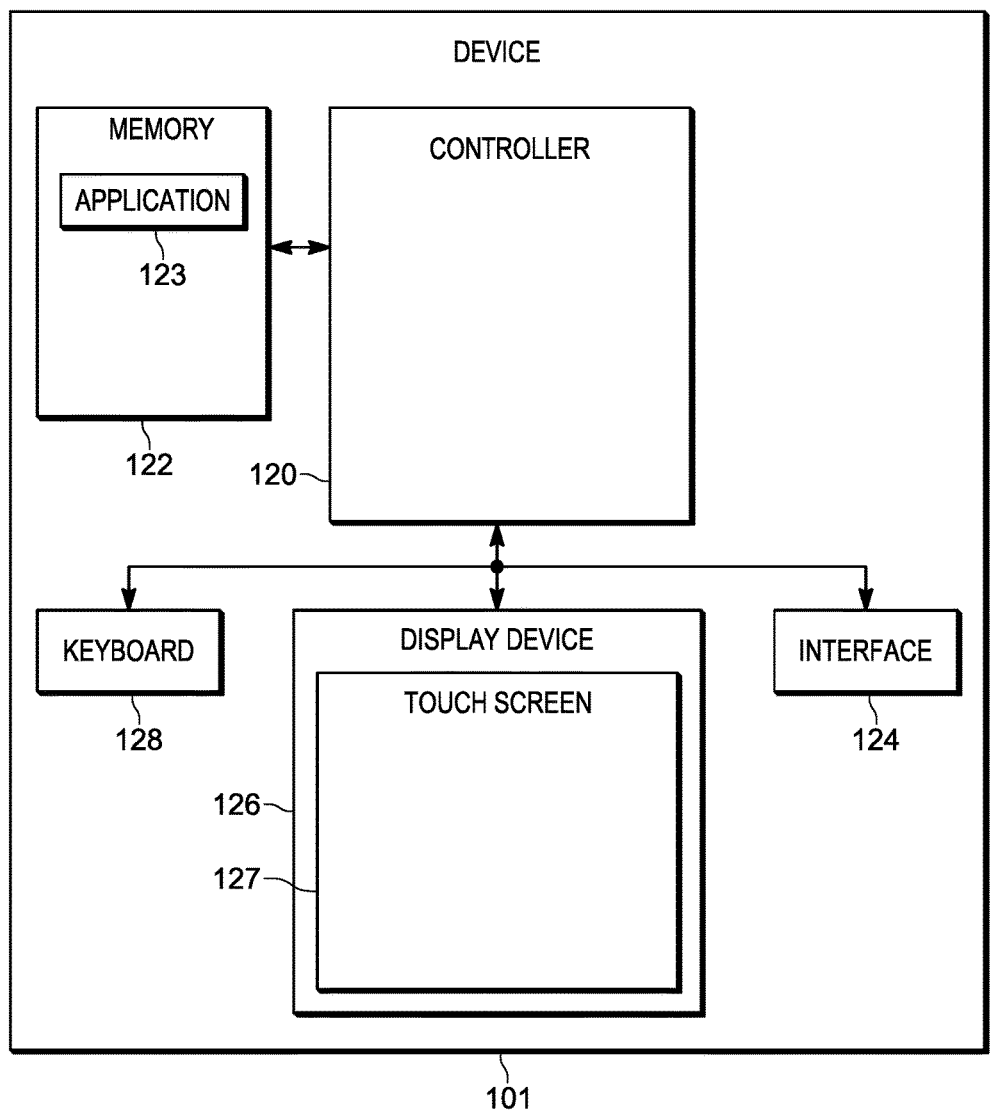
FIG. 2 is a schematic diagram of the device of FIG. 1 in accordance with some embodiments.

Attention is directed to FIG. 1, which depicts a perspective view of a device 101 and FIG. 2 which depicts a schematic block diagram of the device 101. With reference to FIG. 2, the device 101 includes: a controller 120, a memory 122 (storing an application 123), a communication interface 124 (interchangeably referred to the interface 124), a display device 126, including a touchscreen 127 configured to detect touch input, and a keyboard 128. The display device 126, the touchscreen 127 and the keyboard 128 are also depicted in FIG. 1, and the display device 126 is being controlled to generate and/or provide and/or render one or more lines 130 for text entry. As depicted, the display device 126 is being controlled to generate and/or provide and/or render a text entry cursor 131, for example in a text entry field 132, which may include regions of the display device 126 and/or the touchscreen 127 where text may be received and/or rendered. The text entry field 132 may comprise one or more of a field and/or a window for text entry. For example, the one or more lines 130 and/or the text entry field 132 may be generated and/or rendered and/or provided when the device 101 is executing a messaging application (such as a short message service (SMS) application and/or a multimedia messaging service (MMS) application) a text entry application, and the like.

As depicted, the one or more lines 130 for text entry includes previously entered text, however, the one or more lines 130 may include no previously entered text. Whether the one or more lines 130 include previously entered text, or not, text may be added to the one or more lines and/or previously entered text may be edited and/or deleted and/or text may be added to the previously entered text; such addition/editing of text generally occurs at the text entry cursor 131, which may be moved at the one or more lines 130 upon receipt of touch input (e.g. dragging touch input) at the touchscreen 127 as described in more detail below.

Furthermore, text as defined herein may include any type of character that may be entered into a text entry field, and the like, including, but not limited to graphics such as emojis and the like. Hence, the text entry cursor 131 may further indicate a position in the text entry field 132 where graphics, emojis, and the like, may be entered and/or edited.

However, precisely placing the text entry cursor 131 at the one or more lines 130 may be challenging, especially when the touch input is received via a hand wearing a glove. Hence, will be explained hereafter, the device 101 is configured to generate and/or provide and/or render a first axis about parallel to the one or more lines 130 and a second axis about perpendicular the to one or more lines 130, an intersection of the first axis and the second axis defining the text entry cursor 131 at the one or more lines, each of the first axis and the second axis being moveable at the display device 126, to move the intersection, upon receipt of touch input at one or more regions of the touchscreen 127 corresponding to the first axis and the second axis, such touch input including, but not limited to dragging touch input.

As depicted, the device 101 generally comprises a mobile device which includes, but is not limited to, any suitable combination of electronic devices, communication devices, computing devices, portable electronic devices, mobile computing devices, portable computing devices, tablet computing devices, laptop computers, telephones, PDAs (personal digital assistants), cellphones, smartphones, e-readers, mobile camera devices and the like. Other suitable devices are within the scope of present embodiments including non-mobile devices, any suitable combination of work stations, servers, personal computers, dispatch terminals, operator terminals in a dispatch center, and the like. Indeed, any device at which text entry may be received and/or edited at a touchscreen is within the scope of present embodiments.

In some embodiments, the device 101 is specifically adapted for use as a public safety device and may be deployed and/or managed by a public safety and/or first responder agency including, but not limited to, police organizations, health organizations, intelligence organizations, military organizations, government organizations, and the like.

However, the device 101 may further be adapted for use as a consumer device and/or business device, and the like, and/or may include additional or alternative components related to, for example, telephony, messaging, entertainment, and/or any other components that may be used with computing devices and/or communication devices.

However, the display device 126 and the touchscreen 127 may alternatively be provided as a computer display and/or television display separate from the other components of the device 101.

Returning to FIG. 2, the controller 120 includes one or more logic circuits, one or more processors, one or more microprocessors, one or more ASIC (application-specific integrated circuits) and one or more FPGA (field-programmable gate arrays). In some embodiments, the controller 120 and/or the device 101 is not a generic controller and/or a generic device, but a device specifically configured to implement functionality for text entry using two axes at a display device. For example, in some embodiments, the device 101 and/or the controller 120 specifically comprises a computer executable engine configured to implement specific functionality for for text entry using two axes at a display device.

The memory 122 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random access memory ("RAM")). In the embodiment of FIG. 2, programming instructions (e.g., machine readable instructions) that implement the functional teachings of the device 101 as described herein are maintained, persistently, at the memory 122 and used by the controller 120 which makes appropriate utilization of volatile storage during the execution of such programming instructions.

In particular, the memory 122 of FIG. 1 stores instructions corresponding to the application 123 that, when executed by the controller 120, enables the controller 120 to implement text entry using two axes at a display device functionality associated with the application 123. In the illustrated example, when the controller 120 executes the application 123, the controller 120 is enabled to: render, at the display device 126, the one or more lines 130 for text entry; render, at the display device 126, a first axis about parallel to the one or more lines 130; render, at the display device 126, a second axis about perpendicular the to one or more lines 130, an intersection of the first axis and the second axis defining the text entry cursor 131 at the one or more lines 130, each of the first axis and the second axis being moveable at the display device 126, to move the intersection, upon receipt of touch input at one or more regions of the touchscreen 127 corresponding to the first axis and the second axis; and when input is received at the keyboard 128, control the display device 126 to render text at the intersection.

The interface 124 is generally configured to communicate using wired and/or wired links as desired, including, but not limited to, cables, WiFi links and the like. In other words, the interface 124 is enabled to communicate using any suitable combination of wired networks and/or wireless networks. The interface 124 may be implemented by, for example, one or more radios and/or connectors and/or network adaptors, configured to communicate wirelessly, with network architecture that is used to implement one or more communication channels between the device 101 and a wired and/or wireless network. In some embodiments, the interface 124 includes, but is not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications. In yet further embodiments, the interface 124 includes one or more local area network or personal area network transceivers operating in accordance with an IEEE 802.11 standard (e.g., 802.11a, 802.11b, 802.11g), or a Bluetooth™ transceiver. In some embodiments, the interface 124 is further configured to communicate "radio-to-radio" on some communication channels, while other communication channels are configured to use wireless network infrastructure. Example communication channels over which the interface 124 may be generally configured to wirelessly communicate include, but are not limited to, one or more of wireless channels, cell-phone channels, cellular network channels, packet-based channels, analog network channels, Voice-Over-Internet ("VoIP"), push-to-talk channels and the like, and/or a combination. Indeed, the term "channel" and/or "communication channel", as used herein, includes, but is not limited to, a physical radio-frequency (RF) communication channel, a logical radio-frequency communication channel, a trunking talkgroup (interchangeably referred to herein a "talkgroup"), a trunking announcement group, a VOIP communication path, a push-to-talk channel, and the like.

However, it is further understood that the interface 124 may be optional.

The display device 126 comprises any suitable one of, or combination of, flat panel displays (e.g. LCD (liquid crystal display), plasma displays, OLED (organic light emitting diode) displays) and the like, as well as the touchscreen 127.

The touchscreen 127 is generally configured to detect touch input, including dragging touch input, sliding touch input, and the like, and may comprises any suitable combination of capacitive touchscreens and resistive touchscreens.

The keyboard 128 comprises any suitable one of, or combination of physical (e.g. hardware) keyboards and/or virtual keyboard. For example, as depicted, the keyboard 128 comprises a virtual keyboard that has been generated and/or provided and/or rendered at the display device 126 adjacent the text entry field 132; hence, hereafter, the keyboard 128 will be interchangeably referred to as the virtual keyboard 128. Furthermore, while the virtual keyboard 128 is depicted as being "below" the text entry field 132, the virtual keyboard 128 may alternatively be "above" the text entry field 132, to the "left" of the text entry field 132 and/or to the "right" of the text entry field 132 (the terms "above", "below", "left" and "right" being relative to the location of the display device 126 as specifically depicted in the orientation of FIG. 1).

However, alternatively, the keyboard 128 may comprise a hardware keyboard.

Furthermore, the display device 126 (e.g. with the touchscreen 127) and/or the keyboard 128 (whether a virtual keyboard or a hardware keyboard) may be external to the device 101 and accessible to the device 101 via the interface 124; for example, the display device 126 (e.g. with the touchscreen 127) and/or the keyboard 128 may be components of a portable personal computer and/or laptop computer, and the like.

While not depicted, the device 101 may include other input devices, in addition to the touchscreen 127 and the keyboard 128, including, but not limited to, pointing devices, touchpads, buttons, and the like.

While not depicted, the device 101 may further include a battery and/or a power supply and/or a connection to a mains power supply and/or one or more speakers and/or one or more microphones and/or one or more lights and/or one or more haptic devices and/or one or more notification devices.

In any event, it should be understood that a wide variety of configurations for the device 101 are within the scope of present embodiments.

Figure 3:
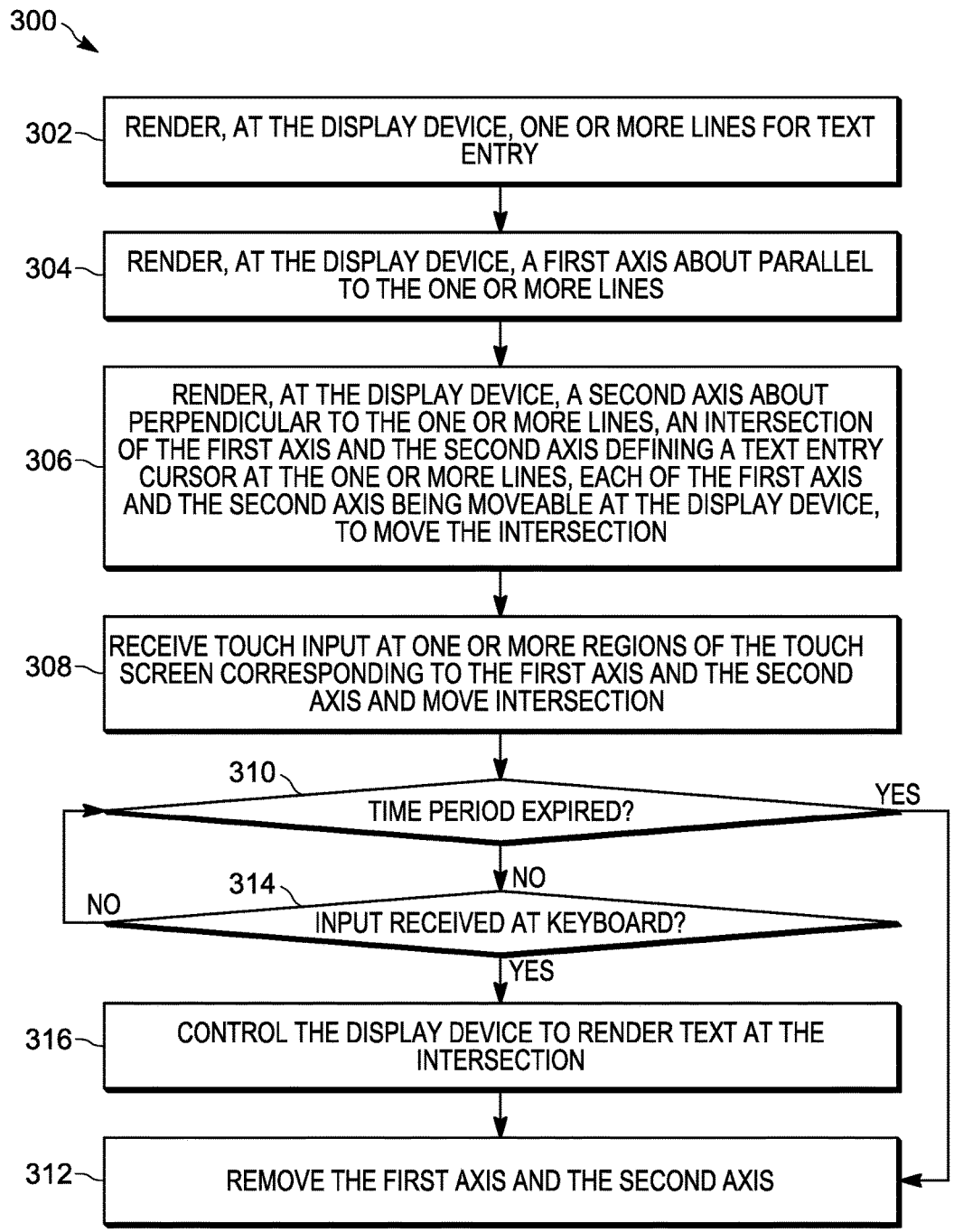
FIG. 3 is a flowchart of a method for text entry using two axes at a display device in accordance with some embodiments.

Attention is now directed to FIG. 3 which depicts a flowchart representative of a method 300 for text entry using two axes at a display device. In some embodiments, the operations of the method 300 of FIG. 3 correspond to machine readable instructions that are executed by, for example, the device 101 of FIG. 1, and specifically by the controller 120 of the device 101. In the illustrated example, the instructions represented by the blocks of FIG. 3 are stored at the memory 122, for example, as the application 123. The method 300 of FIG. 3 is one way in which the device 101 and/or the controller 120 is configured. Furthermore, the following discussion of the method 300 of FIG. 3 will lead to a further understanding of the device 101, and its various components.

However, it is to be understood that the device 101 and/or the controller 120 and/or the method 300 may be varied, and need not work exactly as discussed herein in conjunction with each other, and that such variations are within the scope of present embodiments.

Furthermore, the method 300 of FIG. 3 need not be performed in the exact sequence as shown and likewise various blocks may be performed in parallel rather than in sequence. Accordingly, the elements of method 300 are referred to herein as "blocks" rather than "steps".

Furthermore, while the method 300 is described with respect to the controller 120 rendering lines for text entry and axes, such rendering may alternatively be referred to as generating and/or providing, and the like.

At a block 302, the controller 120 renders, at the display device 126, the one or more lines 130 for text entry. It is hence assumed in the method 300 that the device 101 may be in a text edit mode, for example when the text entry field 132 is provided at the display device 126.

At a block 304, the controller 120 renders, at the display device 126, a first axis about parallel to the one or more lines 130.

At a block 306, the controller 120 renders, at the display device 126, a second axis about perpendicular the to one or more lines 130, an intersection of the first axis and the second axis defining the text entry cursor 131 at the one or more lines 130, each of the first axis and the second axis being moveable at the display device 126, to move the intersection, upon receipt of touch input at one or more regions of the touchscreen 127 corresponding to the first axis and the second axis.

At a block 308, the controller 120 receives touch input at one or more regions of the touchscreen 127 corresponding to the first axis and the second axis, and moves the intersection; as the controller 120 moves the intersection, controller 120 moves the text entry cursor 131 moves to the same position as the intersection. Furthermore, the rendering of the first axis and the second axis may occur in any order and/or in conjunction with each other. Such touch input may generally be indicative of moving touch at the touch screen, and/or a movement of the first axis and/or the second axis, including, but not limited to, dragging touch input, sliding touch input, and the like.

At a block 310, the controller 120 determines whether a given time period has expired. The given time period may be a first given time period following the rendering of the first axis and the second axis at the blocks 304, 306 and/or a second given time period following receiving touch input to move the intersection of the first axis and the second axis at the block 308.

When the given time period has expired (e.g. a "YES" decision at the block 310), at a block 312, the controller 120 removes the first axis and the second axis from the display device 126 (e.g. the controller 120 stops and/or ceases rendering the first axis and the second axis at the display device 126).

Returning to the block 310, when the given time period has not expired (e.g. a "NO" decision at the block 310), at a block 314, the controller 120 determines whether input has been received at the keyboard 128. When input is received at the keyboard 128 (e.g. a "YES" decision at the block 314), at a block 316, the controller 120 controls the display device 126 to render text at the intersection (e.g. at the text entry cursor 131). Such receipt of input at the keyboard 128 at the block 314 and/or rendering of text at the block 316 includes, but is not limited to, respectively, receipt and/or selection of text, graphics and/or emojis, and rendering of such text, graphics and/or emojis. The controller 120 generally implements the block 312 with the block 316 and removes the first axis and the second axis from the display device 126 when input is received at the keyboard 128 (e.g. when a "YES" decision occurs at the block 314). Hence, the controller 120 implements and/or executes the block 316, and the block 312, when the input is received at the keyboard 128 within the given time period.

Returning to the block 314, the controller 120 determines that input is not received at the keyboard 128, (e.g. a "NO" decision at the block 310), the controller 120 continues to wait for the given time period to expire at the block 310 to remove the first axis and the second axis at the block 312.

However, the first axis and the second axis may alternatively be removed at the block 312 any time that the device 101 exits a text entry mode; for example, the device 101 may be controlled to stop rendering the text entry field 132 anywhere in the method 300 (e.g. by way of a menu system, and/or by input being received at the input device 128 to "escape" from the text entry mode), and the controller 120 may responsively execute the block 312 to remove the first axis and the second axis.

Alternatively, the first axis and the second axis may be rendered at the display device 126 as long as a text entry mode is active, regardless of whether input is received at the keyboard 314, and independent of any timers and/or time periods. For example, in these embodiments, controller 120 may be configured to: render the first axis and the second axis at the display device 126 when the device 101 enters a text entry mode and/or the text entry field 132 is provided; and remove the first axis and the second axis at the display device 126 when the device 101 exits the text entry mode. Furthermore, in some of these embodiments, the controller 120 may be configured to alter an appearance of the first axis and the second axis, for example when input is received at the keyboard 128, and the like. In some of these embodiments, the first axis and the second axis may be rendered as solid lines when first rendered and/or being moved, and the first axis and the second axis maybe rendered as dashed lines, and the like, when input is received at the keyboard 128; the controller 120 may hence alter the appearance of the first axis and the second axis depending on whether input is received at the keyboard 128 or not, for example, again rendering the first axis and the second axis as solid lines, after input is received at the keyboard 128 and the first axis and the second axis are again moved.

In any event, in some embodiments, the controller 120 is configured to: render the first axis and the second axis at the display device 126 one or more of: upon entry of a text entry mode; and/or remove the first axis and the second axis from the display device 126 upon exit of a text entry mode The method 300 will now be described with reference to FIG. 4 to FIG. 11.

Figure 4:
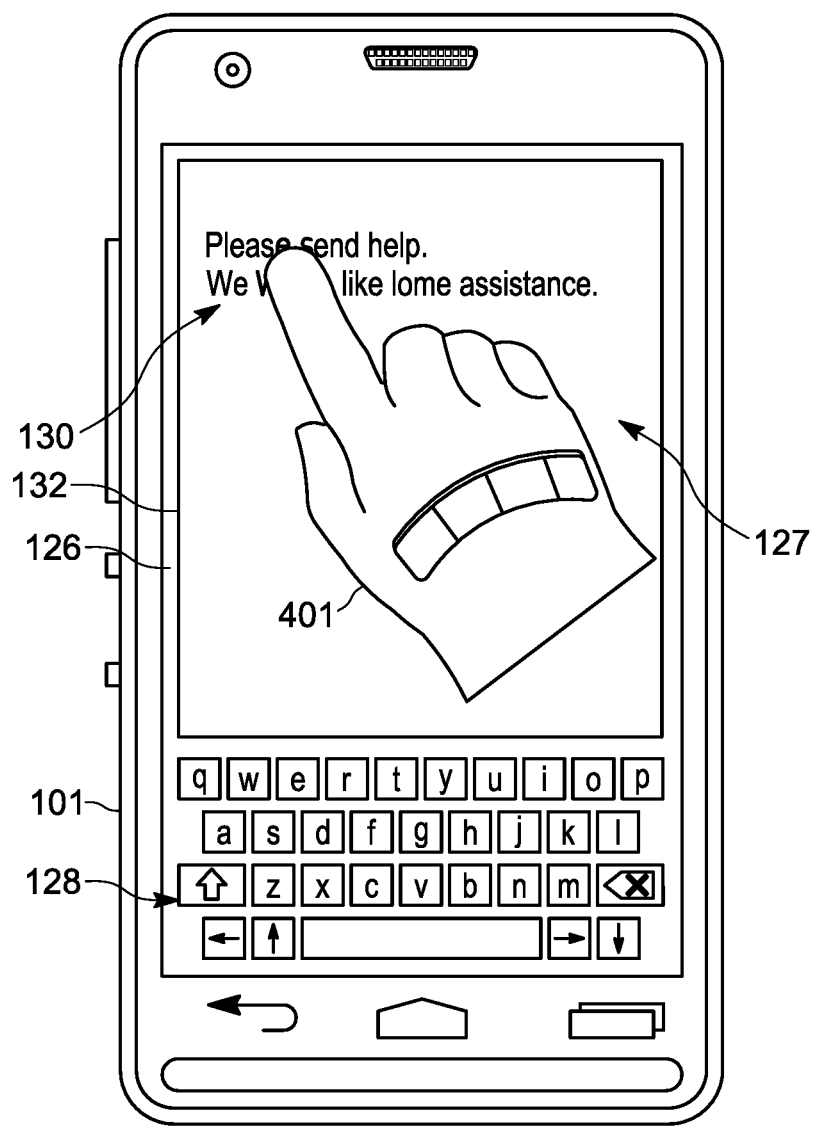
FIG. 4 depicts a gloved hand attempting to interact with one or more lines of a text entry field using a touchscreen of the device of FIG. 1 in accordance with some embodiments.

Attention is next directed to FIG. 4, which is substantially similar to FIG. 1, with like elements having like numbers. In FIG. 4, it is assumed that the block 302 of the method 300 has been implemented and the controller 120 has rendered, at the display device 126, the one or more lines 130 for text entry, which may include receipt of text at the keyboard 128 such that text is rendered (as depicted) at the display device 126; alternatively, rendering of the one or more lines 130 for text entry at the block 302 of the method 300 may include rendering one or more blank lines and/or an initially empty text entry field 132.

As depicted in FIG. 4, a spelling mistake is present in a second line of the one or more lines 130; specifically, the text "lome" is meant to be the word "some". However, the text entry cursor 131 is on the first line of the one or more lines 130, for example at the beginning of the word "send", and/or next to the character "s" of the word "send", and is to be moved to the second line, and specifically to the beginning of the text "lome", and/or next to the character "l" of the text "lome", to correct the spelling mistake.

As further depicted in FIG. 4, a finger of a gloved hand 401 of a user of the device 101 is attempting to interact with the touchscreen 127 to move the text entry cursor 131 (assuming the glove on the hand 401 is compatible with the touchscreen 127 and/or assuming that a portion of the glove that touches the touchscreen 127 is compatible with the touchscreen 127), but the glove blocks display device 126 such that it is challenging to view the position of the text entry cursor 131; indeed, in FIG. 4, the text entry cursor 131 is not visible as the gloved hand 401 is obscuring the text entry cursor 131. It is assumed in FIG. 4 that the finger in the gloved hand 401 has not yet touched the touchscreen 127, but that the finger in the gloved hand 401 is about to touch the touchscreen 127.

Furthermore, while present embodiments are described with respect to a finger of a gloved hand interacting with the touchscreen 127, the finger need not be gloved. Furthermore, the interaction with the touchscreen 127 may occur by way of any body part, and/or using a stylus, and the like.

Figure 5:
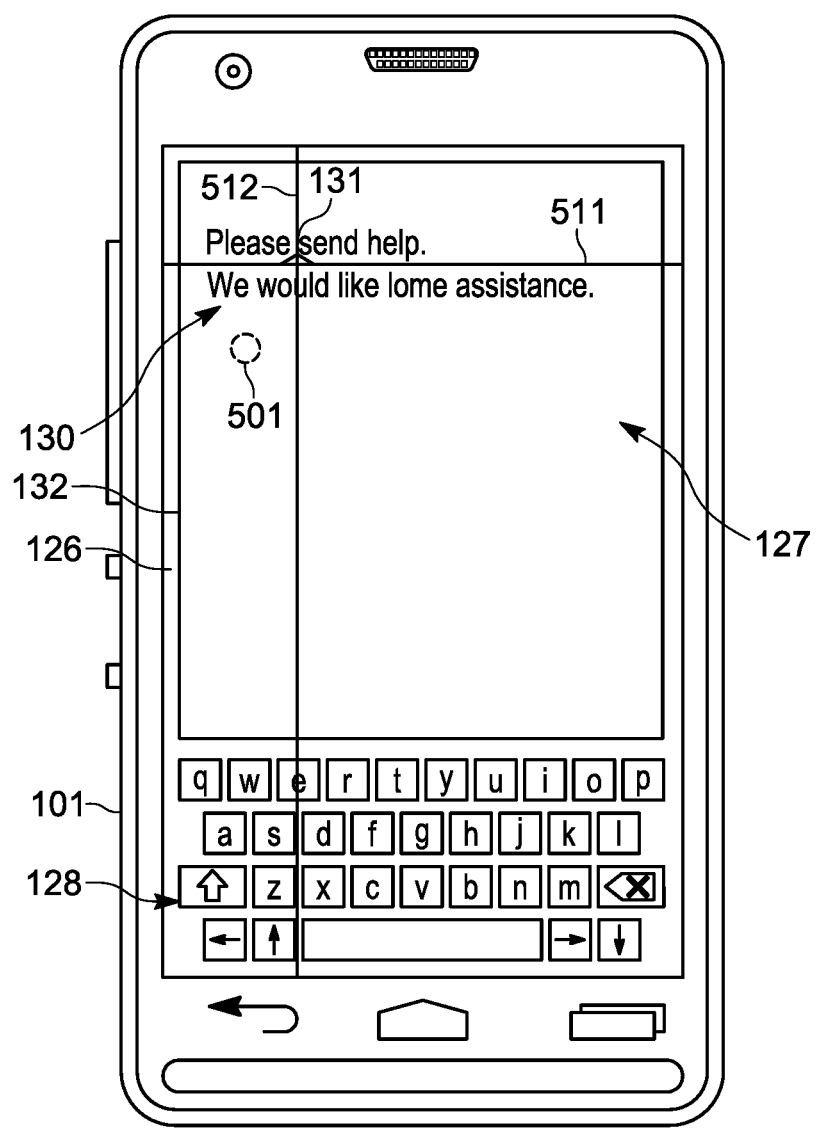
FIG. 5 depicts two axes being rendered at a display device of the device of FIG. 1, an intersection of the two axes defining a text entry cursor in one or more lines in accordance with some embodiments.

Attention is next directed to FIG. 5, which is substantially similar to FIG. 4, with like elements having like numbers. In contrast to FIG. 4, in FIG. 5 it is assumed that the gloved hand 401 has touched the touchscreen 127 at a region 501; while the gloved hand 401 is not depicted for clarity, it is nonetheless assumed to be present.

FIG. 5 further depicts an example embodiment of the blocks 304, 306 of the method 300. In particular, the controller 120 has rendered (e.g. at the block 304), at the display device 126, a first axis 511 about parallel to the one or more lines 130, and further rendered (e.g. at the block 306) a second axis 512 about perpendicular to the one or more lines 130. Put another way, the axes 511, 512 may be about perpendicular to each other. Furthermore, while the axes 511, 512 are depicted as solid lines, one or more of the axes 511, 512 may be in another format, including, but not limited to, dashed lines.

The intersection of the axes 511, 512 is generally located at the text entry cursor 131, and/or the intersection of the first axis 511 and the second axis 512 generally defines the text entry cursor 131 (e.g. the location of the text entry cursor 131) at the one or more lines 130. While as depicted, the text entry cursor 131 remains at the display device 126, in other embodiments, the text entry cursor 131 may be at least temporarily replaced by the intersection of the axes 511, 512.

Hence, as depicted, the first axis 511 is along and/or parallel to the first line, of the one or more lines 130, and the second axis 512 is perpendicular to the first line at the beginning of the word "send" on the first line, and/or the character "s" of the word "send", as the text entry cursor 131 is on the first line at the beginning of the word "send".

Furthermore, the controller 120 may be further configured to render the first axis 511 and the second axis 512 when initial touch input is received at the touchscreen 127 at a region corresponding to the one or more lines 130, such as the region 501. Alternatively, the controller 120 may be configured to render the axes 511, 512 whenever a position of the text entry cursor 131 is to be indicated at the display device 126, for example by the intersection of the axes 511, 512. Alternatively, the controller 120 may be configured to render the axes 511, 512 whenever the text entry field 132 is rendered at the display device 126.

In addition, the region 501 of the touchscreen 127 where touch input is received corresponds to a region of the one or more lines 130. The region 501 may be any region of the display device 126 and/or the touchscreen 127 where text may be received, including any region of the text entry field 132 (e.g. as depicted, any region of the touchscreen 127 other than a region where the virtual keyboard 128 is rendered).

Put another way, in the depicted example, the controller 120 may be configured to render the first axis 511 and the second axis 512 when touch input is received anywhere in the text entry field 132.

In some embodiments, the axes 511, 512 may be rendered only within the text entry field 132; for example, the axes 511, 512 may extend only to the edges of the text entry field 132.

However, as depicted, the one or more lines 130 are rendered in the text entry field 132 at the display device 126, and one or more of the first axis 511 and the second axis 512 extend out of the text entry field 132. For example, as depicted, the first axis 511 extends edge-to-edge across a lateral axis of the display device 126, and the second axis 512 extends edge-to-edge across a longitudinal axis of the display device 126 including into, and through, the virtual keyboard 128 which is rendered adjacent the text entry field 132. Put another way, as depicted, the one or more lines 130 are rendered in the text entry field 132 at the display device 126, the keyboard 128 comprises a virtual keyboard rendered at the display device 126 adjacent the text entry field 132, and one or more of the first axis 511 and the second axis 512 extend out of the text entry field 132 into the virtual keyboard 128.

Figure 6:
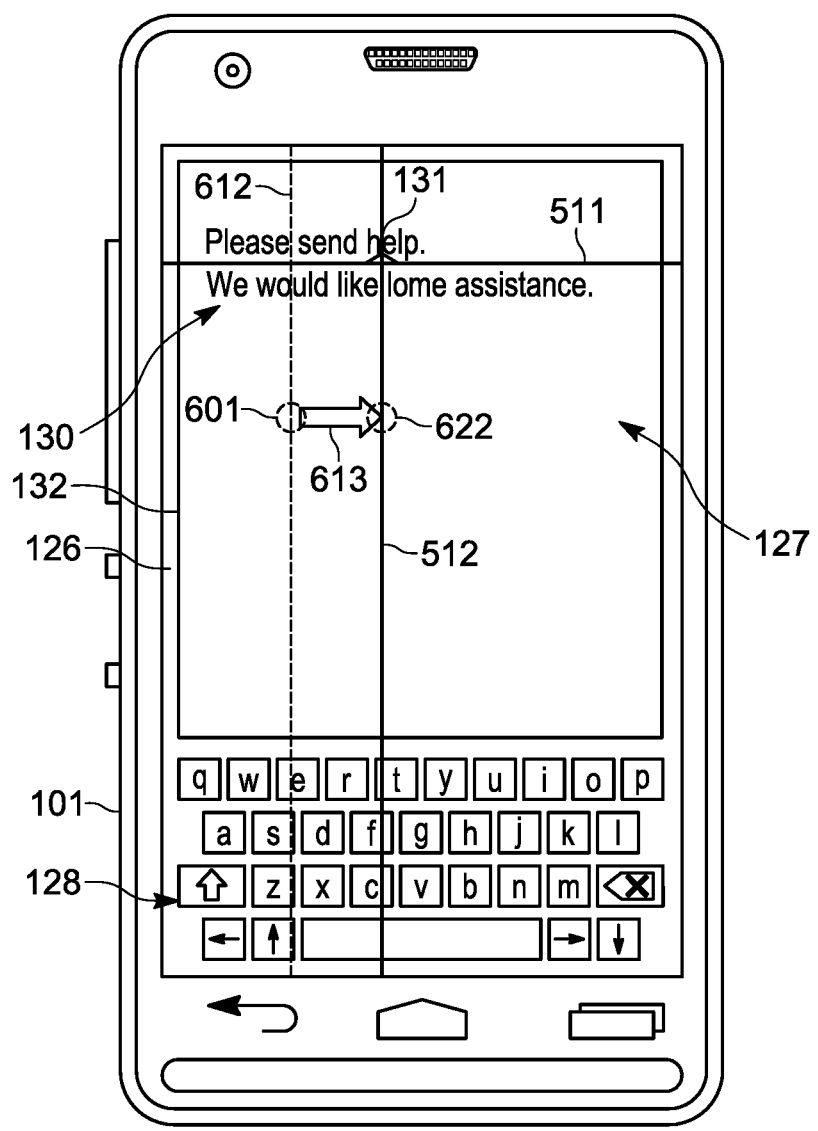
FIG. 6 depicts an axis and the intersection being moved upon receipt of dragging touch input in a region of the touchscreen corresponding to the axis in accordance with some embodiments.

Attention is next directed to FIG. 6, which is substantially similar to FIG. 5, with like elements having like numbers. However, in FIG. 6, touch input has been received at a region 601 of the touchscreen 127 corresponding to a region of the display device 126 where the second axis 512 was initially rendered (e.g. an initial position 612, depicted as a broken line and similar to the position of the second axis 512 depicted in FIG. 5), and dragging touch input 613 has been received at the touchscreen 127 between the region 601 and a region 622, causing the controller 120 to move the second axis 512 from the initial position 612 to the position corresponding to the region 622.

As depicted, a starting position (e.g. the region 601) of the dragging touch input 613 is received anywhere on the touchscreen 127 along the second axis 512, which may include in a region of the virtual keyboard 128. As depicted, the region 601 corresponding to the initial position 612 of the second axis 512 is "below" (e.g. relative to the FIG. 6) the one or more lines 130 and/or anywhere in the text entry field 132 in a region corresponding to the initial position 612 of the second axis 512.

The end position may be anywhere to the "left" or "right" (e.g. relative to the FIG. 6) of the initial position 612 of the second axis 512 as defined by a direction of the dragging touch input 613 at the touchscreen 127. Furthermore, while as depicted the dragging touch input 613 is in a direction perpendicular to the second axis 512, the dragging touch input 613 may be in any direction that has a component in the direction perpendicular to the second axis 512 (e.g. any direction, other than "up" or "down", relative to the FIG. 6); however, the second axis 512 may only move in the direction of the component of the dragging touch input 613 that is perpendicular to the second axis 512. In other words, the dragging touch input 613 need not be exactly perpendicular to the second axis 512, but the second axis 512 is only moved in a direction perpendicular to the second axis 512.

Put another way, after touching the touchscreen 127 in the text entry field 132 (e.g. in the region 501 in FIG. 5) the finger of the gloved hand 401 touches the second axis 512 anywhere along the second axis 512 and "drags" the second axis 512 to another position. For example, as depicted in FIG. 6, the second axis 512 has been dragged from the initial character "s" of the word "send", to the beginning of the text "lome" and/or next to the character "l". However, as the first axis 511 is still along the first line, the intersection of the axes 511, 512 remains on the first line, of the one or more lines 130; for example, as depicted, the text entry cursor 131 has moved to the character "e" in the word "help", which is directly "above" (e.g. relative to the FIG. 6) the beginning of the text "lome" and/or the character "l". Indeed, it is understood that as the dragging touch input 613 is received, the second axis 512 moves character-by-character along the line (of the one or more lines 130) at which the first axis 511 is located.

Put yet another way, the controller 120 may be further configured to move the second axis 512 to a next character of a line of the one or more lines 130 when the dragging touch input 613 is received at a region 601 of the touchscreen 127 corresponding to the second axis 512, the line of the one or more lines 130 defined by a position of the first axis 511, and an initial character defined by an initial position 612 of the second axis 512. Hence, the second axis 512 may be moved character-by-character along the one or more lines 130 via the dragging touch input 613.

Figure 7:
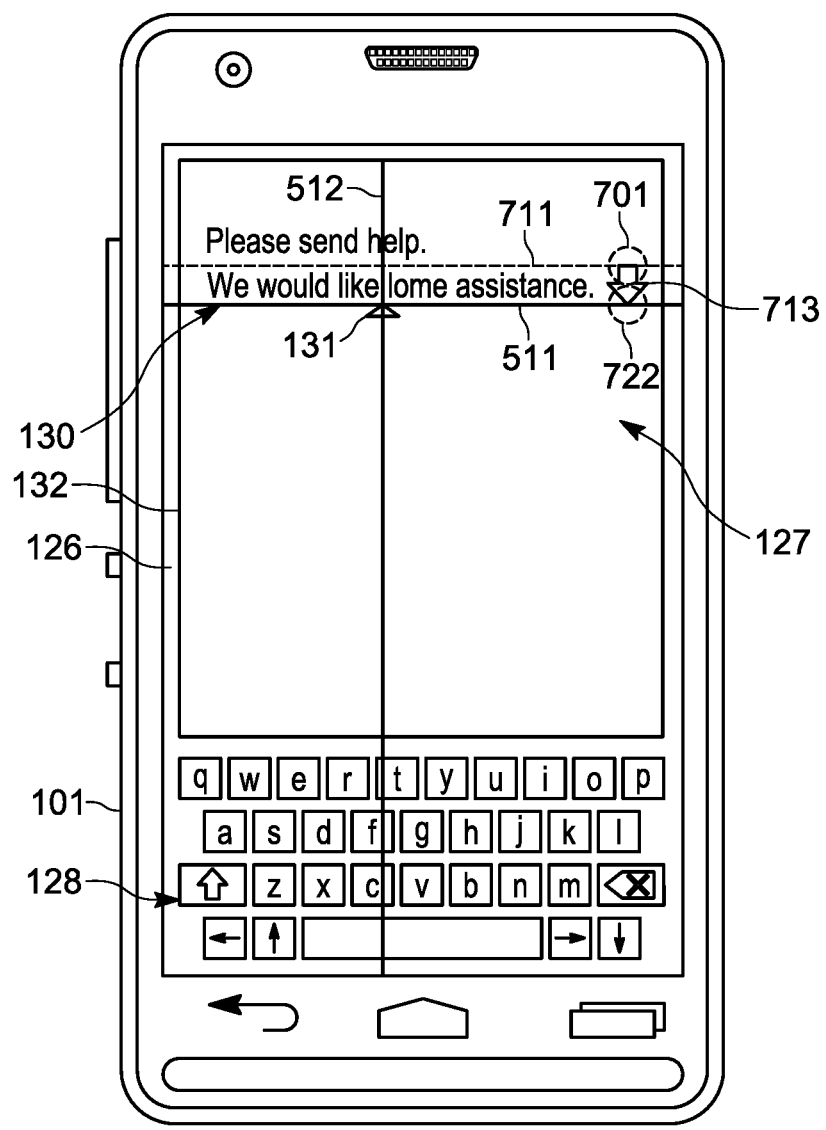
FIG. 7 depicts another axis and the intersection being moved upon receipt of dragging touch input in a region of the touchscreen corresponding to the another axis in accordance with some embodiments.

Attention is next directed to FIG. 7, which is substantially similar to FIG. 6, with like elements having like numbers. However, in FIG. 7, touch input has been received at a region 701 of the touchscreen 127 corresponding to a region of the display device 126 where the first axis 511 was initially rendered (e.g. an initial position 711, depicted as a broken line and similar to the position of the first axis 511 depicted in FIG. 5), and dragging touch input 713 has been received at the touchscreen 127 between the region 701 and a region 722, causing the controller 120 to move the first axis 511 from the initial position 711 to the position corresponding to the region 722.

As depicted, a starting position (e.g. the region 701) of the dragging touch input 713 is received anywhere on the touchscreen 127 along the first axis 511. For example, as depicted, the region 701 corresponding to the initial position 711 of the first axis 511 is to the "right" (e.g. relative to the FIG. 7) of the one or more lines 130 and/or anywhere in the text entry field 132 in a region corresponding to the initial position 711 of the first axis 511.

The end position may be anywhere to "above" or "below" (e.g. relative to the FIG. 7) the initial position 711 of the first axis 511 as defined by a direction of the dragging touch input 713 at the touchscreen 127. Furthermore, while as depicted the dragging touch input 713 is in a direction perpendicular to the first axis 511, the dragging touch input 713 may be in any direction that has a component in the direction perpendicular to the first axis 511 (e.g. any direction, other than "left" or "right", relative to the FIG. 7); however, the first axis 511 may only move in the direction of the component of the dragging touch input 713 that is perpendicular to the first axis 511. In other words, the dragging touch input 713 need not be exactly perpendicular to the first axis 511, but the first axis 511 only moves in a direction perpendicular to the first axis 511.

Put another way, after touching the touchscreen 127 in the text entry field 132 (e.g. in the region 501 in FIG. 5) the finger of the gloved hand 401 touches the first axis 511 anywhere along the first axis 511 and "drags" the first axis 511 to another position. For example, as depicted in FIG. 7, the first axis 511 has been dragged to the second line of the one or more lines 130. Hence, the intersection of the axes 511, 512 has moved to the second line to the beginning of the text "lome", as the second axis 512 is located at the beginning of the text "lome", as occured in the example of FIG. 6. Hence, as depicted, the text entry cursor 131 has moved to the beginning of the text "lome".

Put yet another way, the controller 120 may be further configured to move the first axis 511 to a next line of the one or more lines 130 when the dragging touch input 713 is received at a region of the touchscreen 127 corresponding to the first axis 511, an initial line of the one or more lines defined by an initial position 711 of the first axis 511. Hence, the first axis 511 may be moved line-by-line via the dragging touch input 713.

Figure 8:
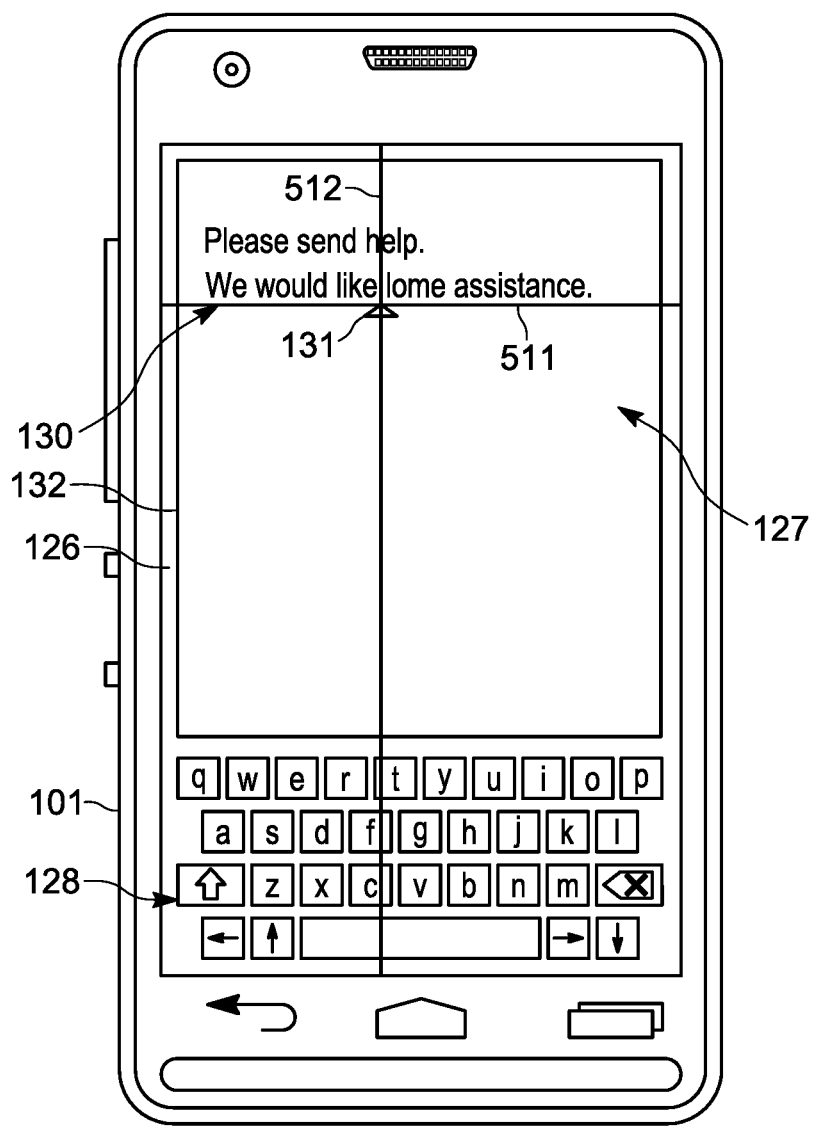
FIG. 8 depicts positions of the intersection of the two axes and the text entry cursor after the two axes are moved using the dragging touch input in accordance with some embodiments.

Hence, with reference to FIG. 8, which is substantially similar to FIG. 7, with like elements having like numbers, the text entry cursor 131 may be moved to any position in the one or more lines 130 by dragging the first axis 511 and the second axis 512 in any order, and any number of times, until the intersection of the axis 511, 512 (and/or the text entry cursor 131) is at a position where text entry and/or text editing is to occur. Furthermore, a direction of movement of the first axis 511 and the second axis 512 is defined by a direction of the dragging touch input 613, 713 at the touchscreen 127. Hence, while in the example embodiments depicted in FIG. 5, FIG. 6, FIG. 7 and FIG. 8, the first axis 511 is dragged from left-to-right, and the second axis 512 is dragged from up-to-down, the first axis 511 may alternatively be dragged from right-to-left, and/or the second axis 512 may alternatively be dragged from down-to-up.

Figure 9:
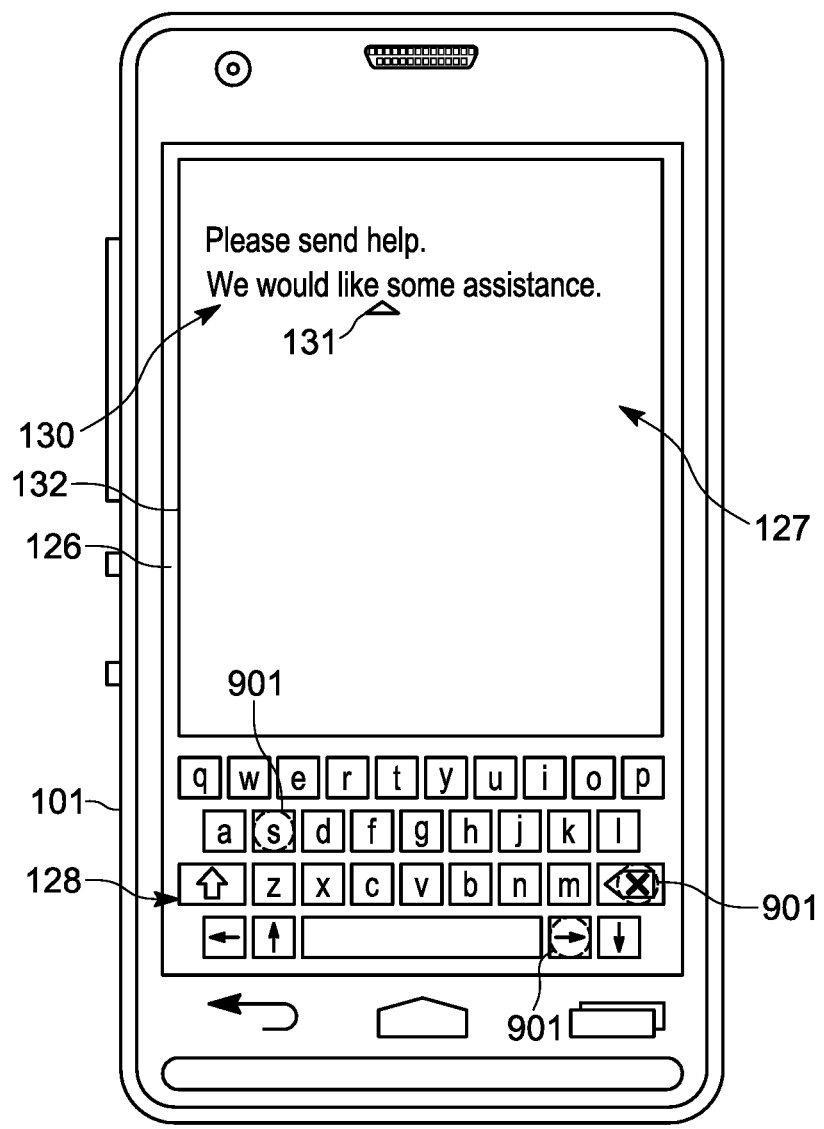
FIG. 9 depicts removal of the two axes upon receipt of input at a keyboard in accordance with some embodiments.
Figure 10:
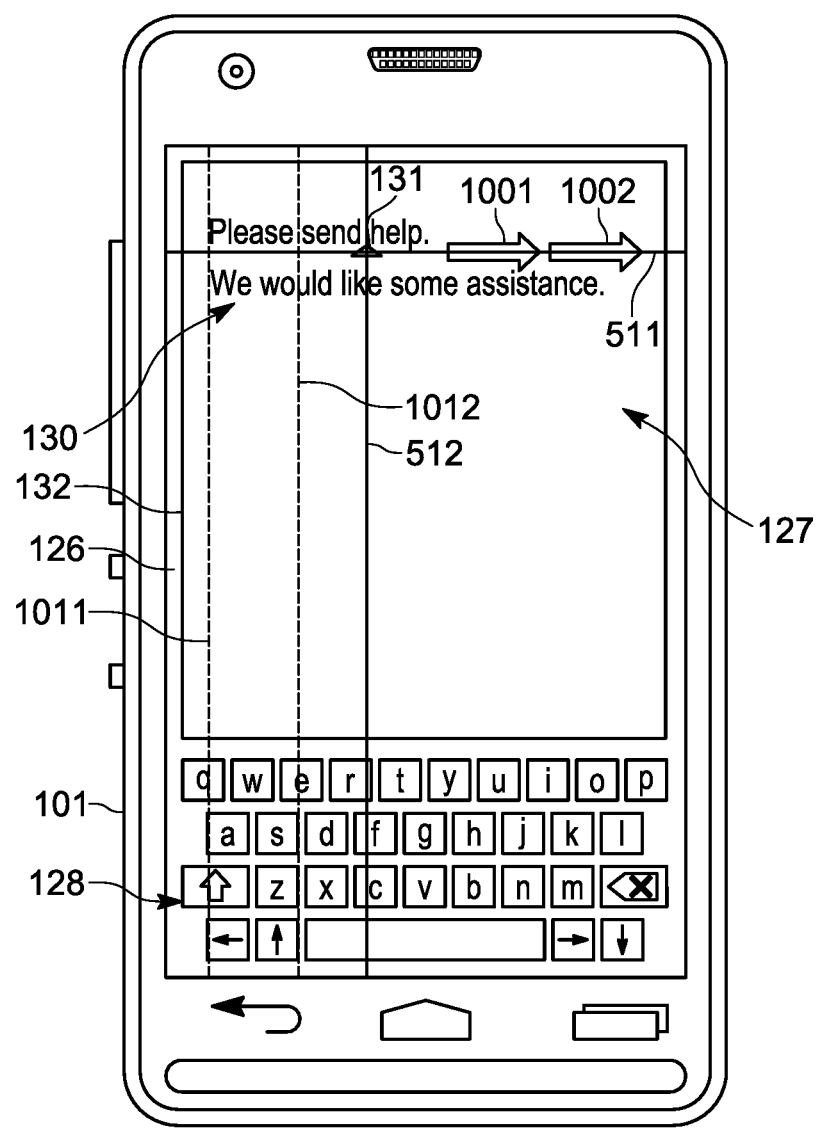
FIG. 10 depicts an axis that is about perpendicular to one or more lines being moved word-by-word when swiping touch input is received at an axis that is about parallel to the one or more lines in accordance with some embodiments.
Figure 11:
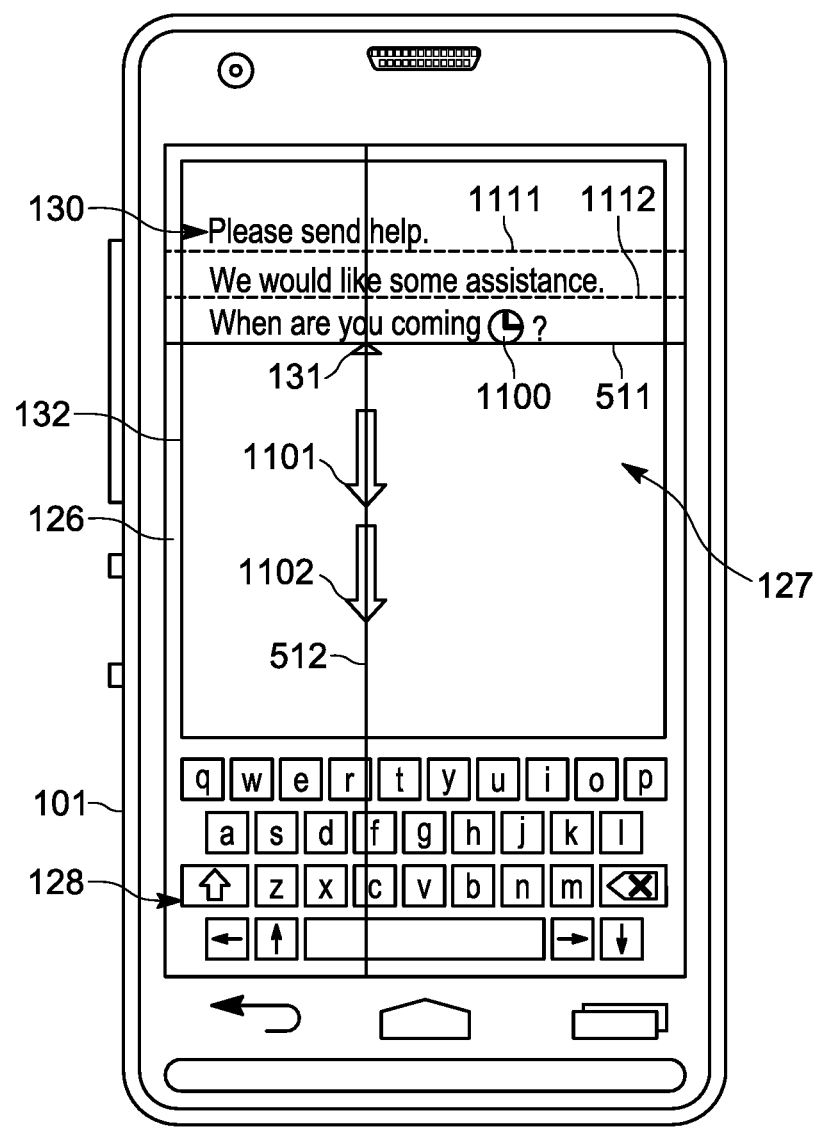
FIG. 11 depicts an axis that is about parallel to one or more lines being moved line-by-line when swiping touch input is received at an axis that is about perpendicular to the one or more lines in accordance with some embodiments.

Attention is next directed to FIG. 9, which depicts input, and specifically touch input, being received at the virtual keyboard 128, for example in regions 901 of the touchscreen 127 that correspond to touching keys of the keyboard 128 to change the text "lome" to the word "some". Furthermore, it is assumed that controller 120 is configured to distinguish between the touch input received at the virtual keyboard 128 in the regions 901 of the touchscreen 127 and the dragging touch input 613 which may be received at the virtual keyboard 128. For example, the touch input received at the virtual keyboard 128 in the regions 901 of the touchscreen 127 that correspond to touching keys of the keyboard 128 may be "taps" which have a different time length and/or configuration as the dragging touch input 613.

Furthermore, FIG. 9 further depicts example embodiments of the blocks 310, 312, 314, 316. In particular, the controller 120 has removed (e.g. at the block 312) the axes 511, 512 from the display device 126, for example upon expiry of the given time period at the block 310 and/or upon receipt of the input at the keyboard 128. Alternatively, however, the controller 120 may not remove the axes 511, 512 upon expiry of the given time period at the block 310 (indeed, such a given time period and/or the block 310 may be optional) and/or upon receipt of the input at the keyboard 128; rather the axes 511, 512 may remain at the display device 126 until a text entry mode is exited; however, in some of these embodiments, the controller 120 may change and/or alter the appearance of the axes 511, 512 upon receipt of the input at the keyboard 128, for example from solid to dashed lines, and the like.

The controller 120 has further controlled the display device 126 (e.g. at the block 316) to render text received via receipt of the input at the keyboard 128 to change the text "lome" to the word "some".

However, when such input is not received at the keyboard 128, the controller 120 may remove the axes 511, 512 at the expiry of the given time period. As describe above, the given time period may include one or more of: a first given time period following rendering of the first axis 511 and the second axis 512; and a second given time period following receipt of the dragging touch input 613, 713 (e.g. when a plurality of dragging touch inputs are received, the second given time period follows receipt of a last received dragging touch input, such as the dragging touch input 713). The given time periods may be configurable, and may be in a range of about a few seconds (e.g. about 2 to about 5 seconds), or may be in a range of greater than a few seconds (e.g. in a range of about 10 to about 20 seconds). When the axes 511, 512 are removed, however, the axes 511, 512 may again be rendered when touch input is again received at the touchscreen 127 at a region corresponding to the one or more lines 130 (and/or in the text entry field 132).

Put another way, the controller 120 may be further configured to remove the first axis 511 and the second axis 512 from the display device 126 when one or more of: input is received at the keyboard 128; after a first given time period following rendering of the first axis 511 and the second axis 512; and after a second given time period following receipt of the dragging touch input (e.g. dragging touch input 613, 713 and/or after receipt of last received dragging touch input).

While the example embodiments of FIG. 6, FIG. 7, FIG. 8 and FIG. 9 have been described with respect to moving the axes 511, 512 using dragging touch input, other types of input may be used to move the axes 511, 512, for example any type of touch input that indicates moving touch input. For example, in yet further embodiments, swiping touch input may be received at a region of the touchscreen 127 corresponding to the first axis 511 may be used to move the second axis 512 word-by-word. For example, attention is next directed to FIG. 10, which is substantially similar to FIG. 9, with like elements having like numbers. However, in FIG. 10, swiping touch input 1001, 1002 is being received at regions of the touchscreen 127 corresponding to the first axis 511 to move the second axis 512 word-by-word. For example, the finger of the gloved hand 401 may be swiping along the first axis 511.

Such swiping touch input 1001, 1002 is different from the dragging touch input 613 used to move the second axis 512 character-by-character, as the swiping touch input 1001, 1002 is received as swipes along the first axis 511, rather than as dragging touch input starting on the second axis 512. Such swiping touch input 1001, 1002 is also different from the dragging touch input 713 used to move the first axis 511 line-by-line as the swiping touch input 1001, 1002 is received as swipes along the first axis 511, rather than as a dragging touch input perpendicular to the first axis 511.

Furthermore, the swiping touch input 1001, 1002 may be distinguished from dragging touch input using a threshold time period, a threshold distances and/or threshold speed. For example, when consecutive touch input is received at the touchscreen 127 within a given threshold time period and/or within a given threshold distance (which, together, may also define a threshold speed of the consecutive touch input, the consecutive touch input having a speed greater than the threshold speed) the consecutive touch input may be determined to be swiping touch input. Similarly, when consecutive touch input is received at the touchscreen 127 in a time period longer than the given threshold time period and/or has a length that is longer than the given threshold length (and/or has a speed less than the threshold speed) the consecutive touch input may be determined to be dragging touch input. Regardless, it is assumed that the controller 120 is configured to distinguish between dragging touch input and swiping touch input.

In any event, as depicted, the second axis 512 had an initial position 1011 (as indicated by a broken line), at the beginning of the first word "Please" of the first line of the one or more lines 130, as the first axis 511 is at the first line of the one or more lines 130; put another way, the intersection of the axes 511, 512 is initially at the beginning of the first word "Please" of the first line. When first swiping touch input 1001 was received along the first axis 511, the second axis 512 (and the intersection of the axes 511, 512) is moved to a second position 1012 (as indicated by a broken line) at the beginning of a next word "send" of the one or more lines 130.

Similarly, when second swiping touch input 1002 was received along the first axis 511, for example after the first swiping touch input 1002, the second axis 512 (and the intersection of the axes 511, 512) is moved to the beginning of a next word "help" of the one or more lines 130. As depicted, the text entry cursor 131 has also moved word-by-word.

Hence, while the dragging touch input 613 perpendicular to the second axis 512 may be used to move the second axis 512 character-by-character, the swiping touch input 1001, 1002 at the first axis 511 may be used to move the second axis 512 word-by-word.

Put another way, the controller 120 may be further configured to move the second axis 512 to a next word of a line of the one or more lines 130 when swiping touch input is received at a region of the touchscreen 127 corresponding to the first axis 511, the line of the one or more lines defined by a position of the first axis 511, and an initial word defined by an initial position 1011 of the second axis 512.

Furthermore, while the swiping touch input 1001, 1002 is depicted as being adjacent to each other, the swiping touch input 1001, 1002 may be received in the same region of the touchscreen 127 that corresponds to the first axis 511. In other words, while the swiping touch input 1001, 1002 may be received consecutively in time, the swiping touch input 1001, 1002 may be received in the same region touchscreen 127 (and/or the swiping touch input 1001, 1002 may be received in the different regions touchscreen 127, each of which corresponding to the first axis 511).

In yet further embodiments, swiping touch input may be received at a region of the touchscreen 127 corresponding to the second axis 512 may be used to move the first axis 511 line-by-line. For example, attention is next directed to FIG. 11, which is substantially similar to FIG. 9, with like elements having like numbers. However, in FIG. 11, the one or more lines 130 includes a third line of text (which includes an emoji 1100 of a clock) and swiping touch input 1101, 1102 is being received at regions of the touchscreen 127 corresponding to the second axis 512 to move the first axis 511 line-by-line. For example, the finger of the gloved hand 401 may be swiping along the second axis 512.

Such swiping touch input 1101, 1102 is different from the dragging touch input 713 used to move the first axis 511 line-by-line, as the swiping touch input 1101, 1102 is received as swipes along the second axis 512, rather than as a dragging touch input starting on the first axis 511. Such swiping touch input 1101, 1102 is also different from the dragging touch input 613 used to move the second axis 512 character-by-character as the swiping touch input 1101, 1102 is received as swipes along the second axis 512, rather than as a dragging touch input perpendicular to the second axis 512.

As depicted, the first axis 511 had an initial position 1111 (as indicated by a broken line), at the first line of the one or more lines 130, and the intersection of the axes 511, 512 had an initial position at the beginning of the word "help" and/or at the character "h" of the word "help". When first swiping touch input 1101 was received along the second axis 512, the first axis 511 (and the intersection of the axes 511, 512) is moved to a second position 1112 at the second line of the one or more lines 130, for example at the character "e" of the word "like", which is directly "below" (e.g. relative to the FIG. 111) the character "h" of the word "help" on the first line.

Similarly, when second swiping touch input 1102 was received along the second axis 512, for example after the first swiping touch input 1101, the first axis 511 (and the intersection of the axes 511, 512) is moved to the third line of the one or more lines 130, for example at the character "u" of the word "you", which is directly "below" (e.g. relative to the FIG. 111) the character "e" of the word "like". As depicted, the text entry cursor 131 has also moved line-by-line.

Hence, the dragging touch input 613 perpendicular to the first axis 511 may be used to move the first axis 511 line-by-line, and alternatively, the swiping touch input 1101, 1102 at the second axis 512 may also be used to move the first axis 511 line-by-line.

Put another way, the controller 120 may be further configured to move the first axis 511 to a next line of the one or more lines 130 when swiping touch input is received at a region of the touchscreen 127 corresponding to the second axis 512, an initial line of the one or more lines 130 defined by the initial position 111 of the first axis 511.

Furthermore, while the swiping touch input 1101, 1102 is depicted as being adjacent to each other, the swiping touch input 1101, 1102 may be received in the same region of the touchscreen 127 that corresponds to the second axis 512. In other words, while the swiping touch input 1101, 1102 may be received consecutively in time, the swiping touch input 1101, 1102 may be received in the same region touchscreen 127 (and/or the swiping touch input 1101, 1102 may be received in the different regions touchscreen 127, each of which corresponding to the second axis 512).

Provided herein is a device and method for text entry using two axes at a display device, which conveniently moves a text entry cursor at an intersection of perpendicular axes, when the axes are dragged using a touchscreen. As the axes may be dragged starting at any position along the axes, and not just at the intersection, the text entry cursor may be repositioned at the display device without a finger, and the like, obscuring the text entry cursor.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A device comprising:
 a controller, a display device, a keyboard and a touchscreen at the display device, the controller configured to:
 render, at the display device, one or more lines for text entry;
 render, at the display device, a first axis about parallel to the one or more lines;
 render, at the display device, a second axis about perpendicular to the one or more lines, an intersection of the first axis and the second axis defining a text entry cursor at the one or more lines, each of the first axis and the second axis being moveable at the display device, to move the intersection, upon receipt of touch input at one or more regions of the touchscreen corresponding to the first axis and the second axis; and
 when input is received at the keyboard, control the display device to render text at the intersection.

2. The device of claim 1, wherein the touch input comprises one or more of dragging touch input and moving touch input, and a direction of movement of the first axis and the second axis is defined by a direction of the touch input at the touchscreen.

3. The device of claim 1, wherein the controller is further configured to render the first axis and the second axis one or more of: upon entry of a text entry mode; and
 when initial touch input is received at the touchscreen at a region corresponding to the one or more lines.

4. The device of claim 1, wherein the controller is further configured to remove the first axis and the second axis from the display device one or more of: when the input is received at the keyboard; after a first given time period following rendering of the first axis and the second axis; after a second given time period following receipt of the touch input; and upon exit of a text entry mode.

5. The device of claim 1, wherein the one or more lines are rendered in a text entry field at the display device, and one or more of the first axis and the second axis extend out of the text entry field.

6. The device of claim 1, wherein the one or more lines are rendered in a text entry field at the display device, the keyboard comprises a virtual keyboard rendered at the display device adjacent the text entry field, and one or more of the first axis and the second axis extend out of the text entry field into the virtual keyboard.

7. The device of claim 1, wherein the controller is further configured to move the first axis to a next line of the one or more lines when the touch input is received at a region of the touchscreen corresponding to the first axis, an initial line of the one or more lines defined by an initial position of the first axis.

8. The device of claim 1, wherein the controller is further configured to move the second axis to a next character of a line of the one or more lines when the touch input is received at a region of the touchscreen corresponding to the second axis, the line of the one or more lines defined by a position of the first axis, and an initial character defined by an initial position of the second axis.

9. The device of claim 1, wherein the controller is further configured to move the second axis to a next word of a line of the one or more lines when swiping touch input is received at a region of the touchscreen corresponding to the first axis, the line of the one or more lines defined by a position of the first axis, and an initial word defined by an initial position of the second axis.

10. The device of claim 1, wherein the controller is further configured to move the first axis to a next line of the one or more lines when swiping touch input is received at a region of the touchscreen corresponding to the second axis, an initial line of the one or more lines defined by an initial position of the first axis.

11. A method comprising:
rendering at a display device, via a controller, one or more lines for text entry;
rendering at the display device, via the controller, a first axis about parallel to the one or more lines;
rendering at the display device, via the controller, a second axis about perpendicular to the one or more lines, an intersection of the first axis and the second axis defining a text entry cursor at the one or more lines, each of the first axis and the second axis being moveable at the display device, to move the intersection, upon receipt of touch input at one or more regions of a touchscreen corresponding to the first axis and the second axis; and
when input is received at a keyboard, controlling, via the controller, the display device to render text at the intersection.

12. The method of claim 11, wherein the touch input comprises one or more of dragging touch input and moving touch input, and a direction of movement of the first axis and the second axis is defined by a direction of the touch input at the touchscreen.

13. The method of claim 11, further comprising one or more of: rendering the first axis and the second axis upon entry of a text entry mode; and rendering the first axis and the second axis when initial touch input is received at the touchscreen at a region corresponding to the one or more lines.

14. The method of claim 11, further comprising removing the first axis and the second axis from the display device one or more of: when the input is received at the keyboard; after a first given time period following rendering of the first axis and the second axis; after a second given time period following receipt of the touch input; and upon exit of a text entry mode.

15. The method of claim 11, wherein the one or more lines are rendered in a text entry field at the display device, and one or more of the first axis and the second axis extend out of the text entry field.

16. The method of claim 11, wherein the one or more lines are rendered in a text entry field at the display device, the keyboard comprises a virtual keyboard rendered at the display device adjacent the text entry field, and one or more of the first axis and the second axis extend out of the text entry field into the virtual keyboard.

17. The method of claim 11, further comprising: moving the first axis to a next line of the one or more lines when the touch input is received at a region of the touchscreen corresponding to the first axis, an initial line of the one or more lines defined by an initial position of the first axis.

18. The method of claim 11, further comprising: moving the second axis to a next character of a line of the one or more lines when the touch input is received at a region of the touchscreen corresponding to the second axis, the line of the one or more lines defined by a position of the first axis, and an initial character defined by an initial position of the second axis.

19. The method of claim 11, further comprising: moving the second axis to a next word of a line of the one or more lines when swiping touch input is received at a region of the touchscreen corresponding to the first axis, the line of the one or more lines defined by a position of the first axis, and an initial word defined by an initial position of the second axis.

20. The method of claim 11, further comprising: moving the first axis to a next line of the one or more lines when swiping touch input is received at a region of the touchscreen corresponding to the second axis, an initial line of the one or more lines defined by an initial position of the first axis.

\* \* \* \* \*